(12) United States Patent
Ostwald et al.

(10) Patent No.: US 6,494,663 B2
(45) Date of Patent: Dec. 17, 2002

(54) METHOD AND SYSTEM FOR SHARING ROBOTIC MECHANISMS BETWEEN AUTOMATED STORAGE LIBRARIES

(75) Inventors: Timothy C. Ostwald, Louisville, CO (US); Daniel James Plutt, Superior, CO (US)

(73) Assignee: Storage Technology Corporation, Louisville, CO (US)

( * ) Notice: Subject to any disclaimer, the term of this patent is extended or adjusted under 35 U.S.C. 154(b) by 36 days.

(21) Appl. No.: 09/726,863

(22) Filed: Nov. 30, 2000

(65) Prior Publication Data

US 2001/0000062 A1 Mar. 29, 2001

Related U.S. Application Data

(63) Continuation-in-part of application No. 09/354,814, filed on Jul. 16, 1999.

(51) Int. Cl.[7] .................................................. B65G 1/04
(52) U.S. Cl. .................... 414/281; 360/92; 414/277; 414/279; 414/222.01
(58) Field of Search .................... 414/281, 282, 414/283, 277, 751.1, 753.1, 222.01, 225.01, 279; 360/92

(56) References Cited

U.S. PATENT DOCUMENTS

| | | | |
|---|---|---|---|
| 4,504,936 A | | 3/1985 | Faber et al. |
| 4,937,690 A | * | 6/1990 | Yamashita et al. ............. 360/92 |
| 5,215,420 A | * | 6/1993 | Hughes et al. ............... 414/217 |
| 5,388,946 A | | 2/1995 | Baur |
| 5,395,199 A | | 3/1995 | Day, III et al. |
| 5,418,971 A | * | 5/1995 | Carlson ..................... 360/92 X |
| 5,429,470 A | | 7/1995 | Nicol et al. |
| 5,570,337 A | | 10/1996 | Dang |
| 5,612,934 A | * | 3/1997 | Dang et al. ............... 360/92 X |
| 5,646,917 A | | 7/1997 | Miyoshi et al. |
| 5,703,843 A | | 12/1997 | Katsuyama et al. |
| 6,025,972 A | * | 2/2000 | Schmidtke et al. ...... 360/98.06 |
| 6,229,667 B1 | * | 5/2001 | Ostwald ..................... 360/92 |
| 6,262,863 B1 | * | 7/2001 | Ostwald et al. ............... 360/92 |

FOREIGN PATENT DOCUMENTS

| | | |
|---|---|---|
| DE | 3843216 | 6/1990 |
| EP | 0 982 723 | 3/2000 |
| WO | 01/06506 | 1/2001 |

* cited by examiner

Primary Examiner—Frank E. Werner
(74) Attorney, Agent, or Firm—Brooks & Kushman P.C.

(57) ABSTRACT

A method and system for sharing robotic mechanisms between physically remote storage libraries in an automated storage library system includes routing robotic mechanism guide structures between the storage libraries. The guide structures run through robotic mechanism transfer ports located on the sides of the housing enclosures of the storage libraries. A robotic mechanism within an first storage library moves through the transfer port of the enclosure of the first storage library onto the guide structure. The robotic mechanism then moves out of the enclosure of the first storage library along the guide structure towards a second storage library. The robotic mechanism then moves along the guide structure through the transfer port of the enclosure of the second storage library and into the second storage library for performing operations such as accessing media objects within the second storage library.

14 Claims, 2 Drawing Sheets

METHOD AND SYSTEM FOR SHARING ROBOTIC MECHANISMS BETWEEN AUTOMATED STORAGE LIBRARIES

CROSS-REFERENCE TO RELATED APPLICATIONS

This application is a continuation-in-part of co-pending application U.S. Ser. No. 09/354,814, filed on Jul. 16, 1999, entitled "Inter-Library Connectivity Using Transport Robots on Rail System."

TECHNICAL FIELD

The present invention generally relates to automated media storage library systems having robotic mechanisms that move about tracks for manipulating media objects such as cartridges within storage libraries and, more particularly, to a method and system for sharing robotic mechanisms between automated storage libraries.

BACKGROUND ART

Existing automated media storage libraries are capable of storing and retrieving large quantities of information stored on media objects such as media cartridges. This is accomplished by the use of a large number of cartridge storage cells, each of which houses a media cartridge, that are housed within an enclosure. Such storage libraries use a robotic mechanism (e.g., robot, picker, handbot, accessor, and the like) to quickly move the media cartridges between their media cartridge storage cells and media cartridge players. For example, to retrieve information that is stored on a selected media cartridge, a robotic mechanism moves to a location opposite the media cartridge storage cell housing the selected media cartridge. An end effector of the robotic mechanism then grasps the media cartridge and extracts it from the media cartridge storage cell to a media player where the end effector loads the media cartridge into the media player.

As automated storage libraries have become larger and more complex, their designs have evolved from a single robotic arm performing all media cartridge manipulations to multiple robotic mechanisms operating on several media cartridges and media players simultaneously. The ability to manipulate several media cartridges simultaneously has increased the throughput of the automated storage libraries. While one independent robotic mechanism is busy transferring one media cartridge from a media storage cell to a media player for mounting, a second independent robotic mechanism can be transferring another media cartridge to an access port, while a third robotic mechanism may be conducting an inventory of the storage library.

A typical automated storage library includes support tracks laid out throughout the storage library. The robotic mechanisms mount to the tracks to move throughout the storage library to access the media cartridges and the media players. The robotic mechanisms may include drive or propulsion means coupled to driving wheels for moving along the tracks. The robotic mechanisms may further include media cartridge pickers, bar code reading devices, and other task oriented sub-modules for performing various tasks on media cartridges and media players.

The most common automated storage libraries are configured as either a two dimensional array of storage cells resembling bookshelves or a cylinder of storage cells resembling farm silos. Typically, an automated storage library system includes a plurality of individual automated storage libraries arranged in proximity to one another. Each storage library typically includes a load/unload media cartridge port for inserting and removing media cartridges into and out of the storage library. Pass through ports may be installed between adjacent storage libraries to allow the transfer of media cartridges between adjacent storage libraries.

A problem with typical automated storage library systems having physically separated storage libraries is that storage libraries do not share the robotic mechanisms. Robotic mechanisms contained within each storage library for performing operations within their corresponding storage libraries cannot move from a first storage library to a second storage library for performing operations in the second storage library. Each storage library has its own set of robotic mechanisms for performing operations within that storage library. There is no provision for allowing a robotic mechanism configured to perform operations within a first storage library to be physically moved from the first storage library and then placed within a second storage library for performing operations within the second storage library short of an operator physically removing the robotic mechanism from the first storage library and then placing it into the second storage library.

SUMMARY OF THE INVENTION

Accordingly, it is an object of the present invention to provide a method and system for sharing robotic mechanisms between physically separated automated storage libraries of an automated storage library system.

It is another object of the present invention to provide a method and system for sharing robotic mechanisms between physically separated automated storage libraries in which the robotic mechanisms move along guide structures laid out between individual storage libraries in order to move from within a first storage library and into a second storage library to perform operations in the second storage library.

In carrying out the above objects and other objects, the present invention provides a storage library system including first and storage libraries. The first and second storage libraries each has an enclosure with a robotic mechanism transfer port. A robotic mechanism is positioned within the first storage library for performing operations within the first storage library, and a second storage library. A guide structure is routed from the robotic mechanism transfer port of the first storage library to the robotic mechanism transfer port of the second storage library. The robotic mechanism is movable along the guide structure from within the enclosure of the first storage library to within the enclosure of the second storage library for performing operations within the second storage library.

In carrying out the above objects and other objects, the present invention further provides a method for operating a storage library system having first and second storage libraries. Each of the first and second storage libraries has an enclosure with a robotic mechanism transfer port. A guide structure is routed from the robotic mechanism transfer port of the first storage library to the robotic mechanism transfer port of the second storage library. The method includes positioning a robotic mechanism within the enclosure of the first storage library for performing operations within the first storage library. The robotic mechanism then moves along the guide structure from within the enclosure of the first storage library to within the enclosure of the second storage library for performing operations within the second storage library.

The advantages associated with the present invention are numerous. A storage library having multiple redundant robotic mechanisms has improvements in performance, reliability, and flexibility as compared with storage libraries not having the redundancy. Adding connectivity such as a guide structure to enable robotic mechanisms to be shared between remotely located storage libraries adds a further measure of redundancy.

The following example describes some of the advantages associated with the present invention. An operator of a storage library system having three physically separated storage libraries may determine that one storage library is to archive data and the other two storage libraries are for on-line actions. Connecting the three storage libraries with a guide structure enables the operator to have less overall robotic mechanisms because dedicated robotic mechanisms will not have to sit idle in the archive storage library. When archiving is required many robotic mechanisms can move from the on-line storage libraries to the archive storage library and work on retrieving large amounts of media at one time in order to carry out the archiving process.

The above objects and other objects, features, and advantages of the present invention are readily apparent from the following detailed description of the best mode for carrying out the present invention when taken in connection with the accompanying drawings.

BEST MODES FOR CARRYING OUT THE INVENTION

Figure 1:
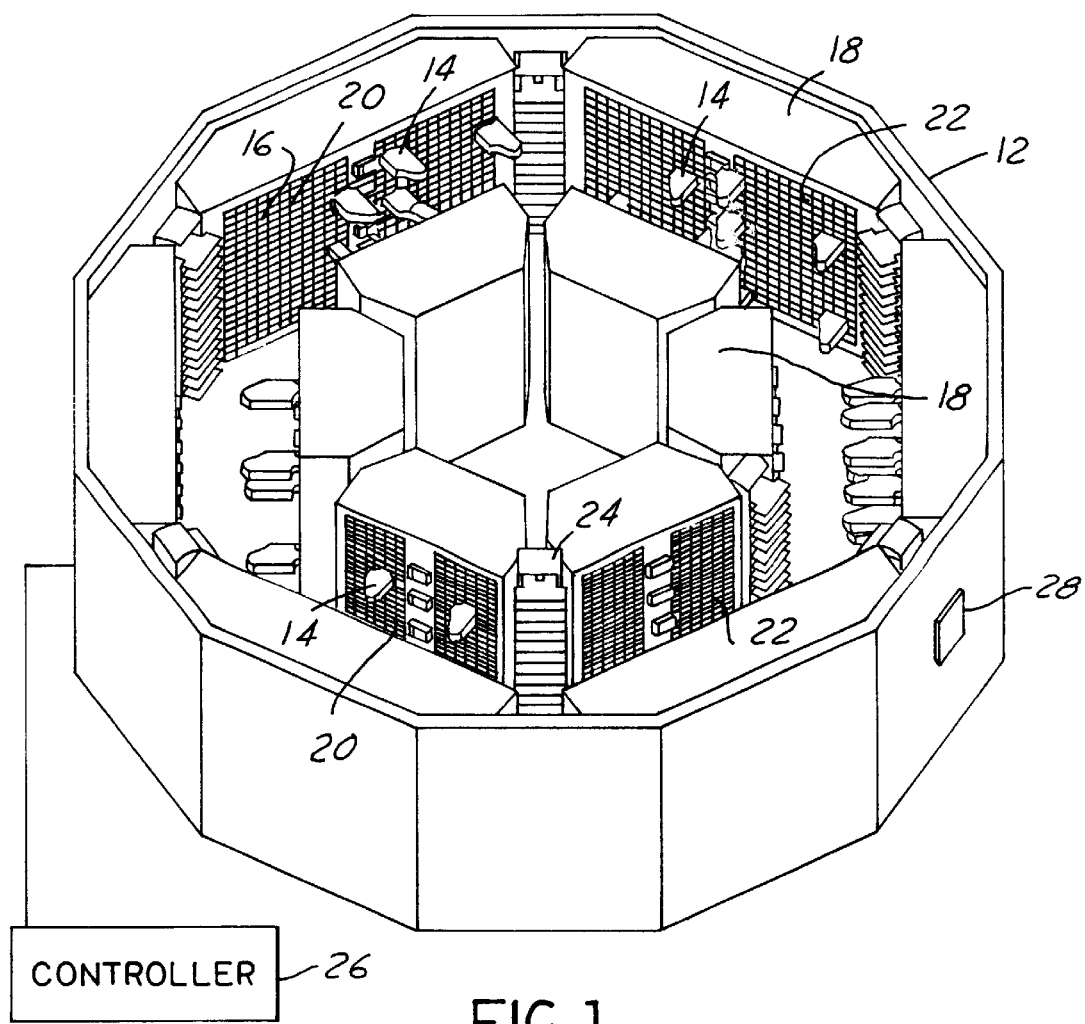
FIG. 1 illustrates an exemplary storage library of an automated storage library system for use with the method and system of the present invention.

Referring now to FIG. 1, a storage library 10 of an automated storage library system for use with method and system of the present invention is shown. Storage library 10 includes a cylindrical housing enclosure 12 containing multiple independent robotic mechanisms (robotic pods) 14 to enable the storage library to concurrently manipulate multiple media objects such as media cartridges 16. Storage library 10 includes a plurality of concentric, substantially cylindrical storage arrays 18 of media cartridge storage cells 20 and media cartridge players 22 within housing enclosure 12. A system of storage array horizontal guide tracks guide robotic mechanisms 14 through all of the locations of storage arrays 18 in order to enable the robotic mechanisms to access media cartridge storage cells 20 and media cartridge players 22.

Storage arrays 18 are designed to receive a plurality of rows of media cartridge storage cells 20 each of which houses a media cartridge 16. Media cartridge players 22 are shown in an arbitrary location in storage arrays 18. Robotic mechanisms 14 are attached to storage arrays 18 via horizontal guide tracks which serve to frame media cartridge storage cells 20 and media cartridge players 22 on the top and bottom sides thereof. Storage library 10 includes storage arrays 18 of media cartridge storage cells 20 fully populated with media cartridges 16 of any type. The guide tracks of storage arrays 18 provide support for robotic mechanisms 14 in the vertical direction to oppose the force of gravity, and they also provide a meshing surface to impart traction in the horizontal direction for motive transport of the robotic mechanisms. Robotic mechanisms 14 may each incorporate drive means for propulsion in the horizontal direction along the horizontal guide tracks.

Storage library 10 further includes vertical elevator assemblies 24 that enable the transfer of robotic mechanisms 14 in the vertical direction. Each elevator assembly 24 includes elevator stations having track segments that are identical in cross section to the guide tracks of storage arrays 18. When a vertical displacement is required of any robotic mechanism 14, an elevator station is scheduled to move in alignment to the appropriate level of rows of a storage array 18 to allow transfer of the robotic mechanism onto the elevator track segments. Once robotic mechanism 14 is located on the elevator station, a drive motor of elevator assembly 24 is activated to transport the robotic mechanism to a selected one of the rows of storage array 18 and thence moves on to the pair of horizontal guide tracks of the storage array corresponding to the selected row.

A storage library control unit (controller) 26 provides commands to robotic mechanisms 14 and elevator stations 24 for the robotic mechanisms to manipulate media cartridges 16. Controller 26 communicates with each robotic mechanism 14 individually by radio frequency communication links, infrared communication links, or other wireless links. Wired communication links may also be used. Commands to robotic mechanisms 14 include movement along the guide tracks of storage arrays 18, movement of media cartridges 16 into and out of the robotic mechanisms, reading bar codes of the media cartridges, and the like.

Controller 26 and robotic mechanisms 14 are operable with one another such that the controller knows the position of the robotic mechanisms within storage library 10 as they move about the guide tracks of storage arrays 18. This is accomplished by mounting position sensors on robotic mechanisms 14 which provide information regarding the position of the robotic mechanisms to controller 26. This may also be accomplished by providing sensors on the guide tracks of storage arrays 18 which are actuated to transmit a signal to controller 26 when a robotic mechanism 14 traverses a sensor on the horizontal guide tracks.

Controller 26 may also be in communication with media cartridge players 22. Controller 26 may provide commands to mount and dismount media cartridges 16 into and out of media cartridge players 22. Controller 26 coordinates these commands with positioning commands to a robotic mechanism 14 that supplies or receives a media cartridge 16 to and from a media cartridge player 22. An external source (not shown) may provide the mount and dismount commands directly to media cartridge players 22. Here, controller 26 coordinates with the external source to position the proper robotic mechanism 14 adjacent media cartridge player 22 prior to the mount or dismount command being given to the media cartridge player.

In accordance with the method and system of the present invention, storage library 10 further includes a robotic mechanism transfer port or door 28 on housing 12 for enabling robotic mechanisms 14 to be transferred into and out of the storage library. As will be explained in greater detail with reference to FIG. 2, transfer port 28 enables a robotic mechanism 14 to be transferred into enclosure 12 of storage library 10 from another physically distinct storage library and out of enclosure 12 of storage library 10 into the enclosure of the other physically distinct storage library. Transfer port 28 is configured to allow robotic mechanisms 14 to pass into and out of enclosure 12 of storage library 10 while limiting human operator access to the area inside the enclosure of the storage library.

Figure 2:
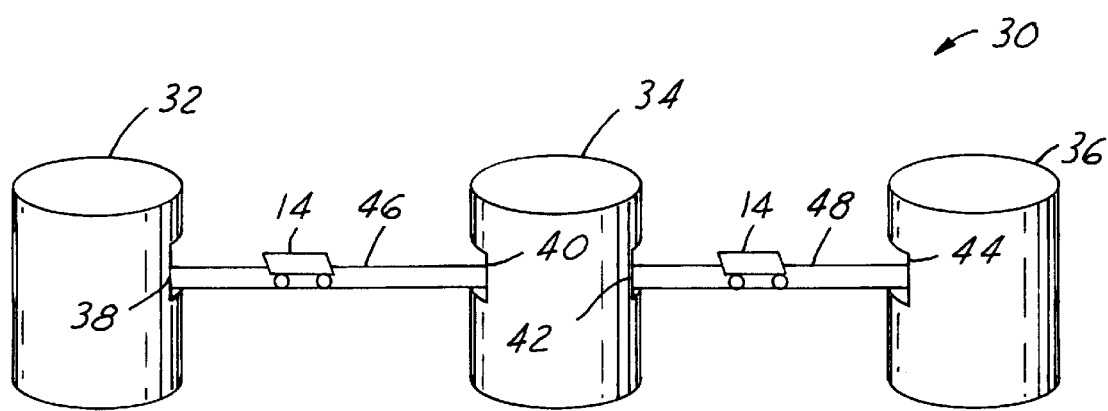
FIG. 2 illustrates an automated storage library system having physically distinct storage libraries for use with the method and system of the present invention.

Referring now to FIG. 2, an automated storage library system 30 for use with the method and system of the present invention is shown. Automated storage library system 30 includes a plurality of individual storage libraries 32, 34, and 36. Storage libraries 32, 34, and 36 are physically distinct from one another and are located remote from one another. As an example, storage library 32 is located in a first room, storage library 34 is located in a second room, and storage library 36 is located in a third room. Of course, storage libraries 32, 34, and 36 may be located next to each other with the enclosures of the storage libraries touching each other. Each storage library 32, 34, and 36 includes at least one robotic mechanism transfer port located on the side of their respective housings. Storage library 32 includes transfer port 38, storage library 34 includes transfer ports 40 and 42, and storage library 36 includes transfer port 44.

Robotic mechanism guide structures 46 and 48 such as tracks or rails running between storage libraries 32, 34, and 36 connect the storage libraries. Guide structures 46 and 48 and transfer ports 38, 40, 42, and 44 provide a means for robotic mechanisms 14 to bi-directionally move from within one storage library enclosure to within another storage library enclosure. This allows a robotic mechanism 14 to be made available for use within any storage library 32, 34, and 36 of automated storage library system 30. This is particularly useful in that robotic mechanisms 14 may be allocated to any one of storage libraries 32, 34, and 36 for performing operations within the allocated storage library as a function of demand.

Guide structure 46 connects storage libraries 32 and 34 and guide structure 48 connects storage libraries 34 and 36. Guide structures 46 and 48 run from within the housing enclosures of the storage libraries through the transfer ports and external to the housing enclosures of the storage libraries. For instance, guide structure 46 runs from within the housing enclosure of storage library 32, through transfer port 38, outside of the housing enclosures of storage libraries 32 and 34, through transfer port 40, and into the housing enclosure of storage library 34. Similarly, guide structure 48 runs from within the housing enclosure of storage library 34, through transfer port 42, outside of the housing enclosures of storage libraries 34 and 36, through transfer port 44, and into the housing enclosure of storage library 36.

Figure 3:
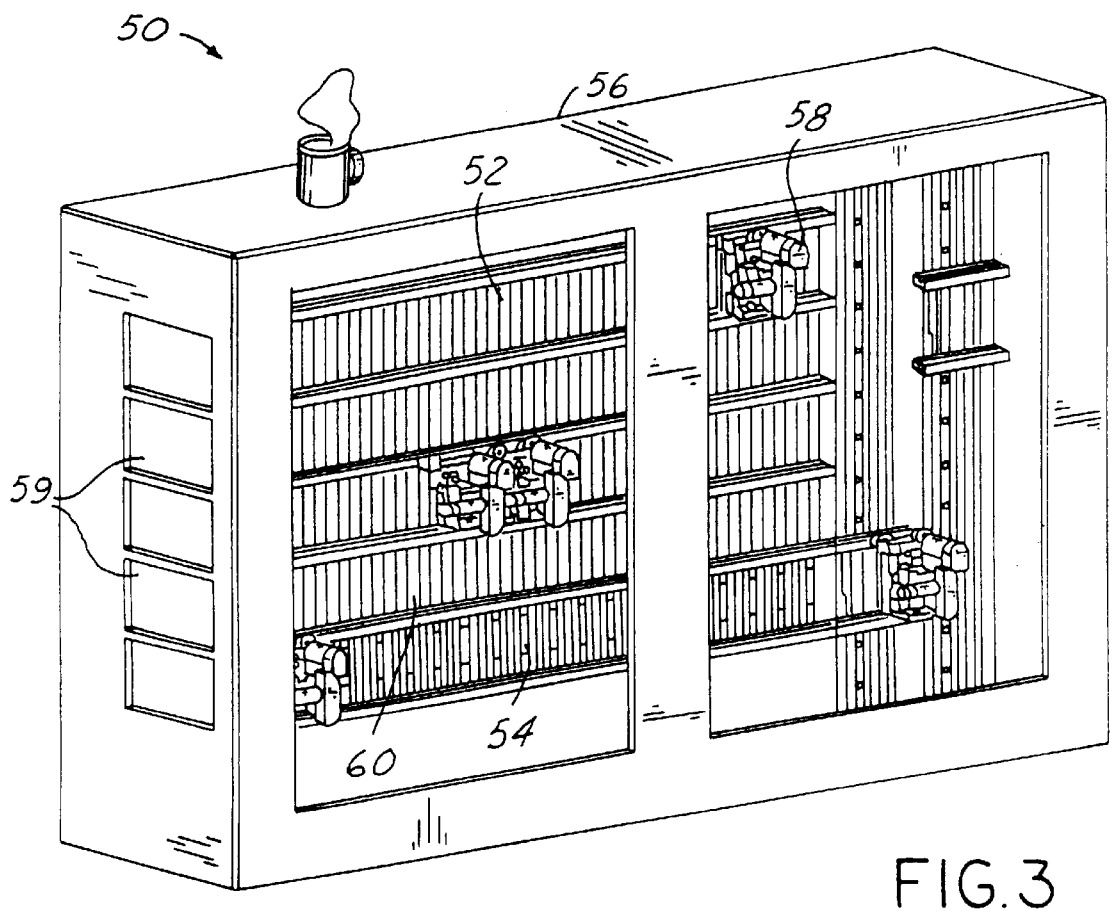
FIG. 3 illustrates another storage library of an automated storage library system for use with the method and system of the present invention.

Referring now to FIG. 3, a rectangular storage library 50 of an automated storage library system for use with method and system of the present invention is shown. Storage library 50 includes a two dimensional vertical standing array of media cartridge storage cells 52 and media cartridge players 54 that are mounted in a frame 56. Storage library 50 further includes multiple independent robotic mechanisms 58 to enable the storage library to concurrently manipulate multiple media cartridges 60. Frame 56 includes robotic mechanism transfer ports 59 located on each row for enabling robotic mechanisms 58 to enter and exit the interior of storage library 50.

Figure 4:
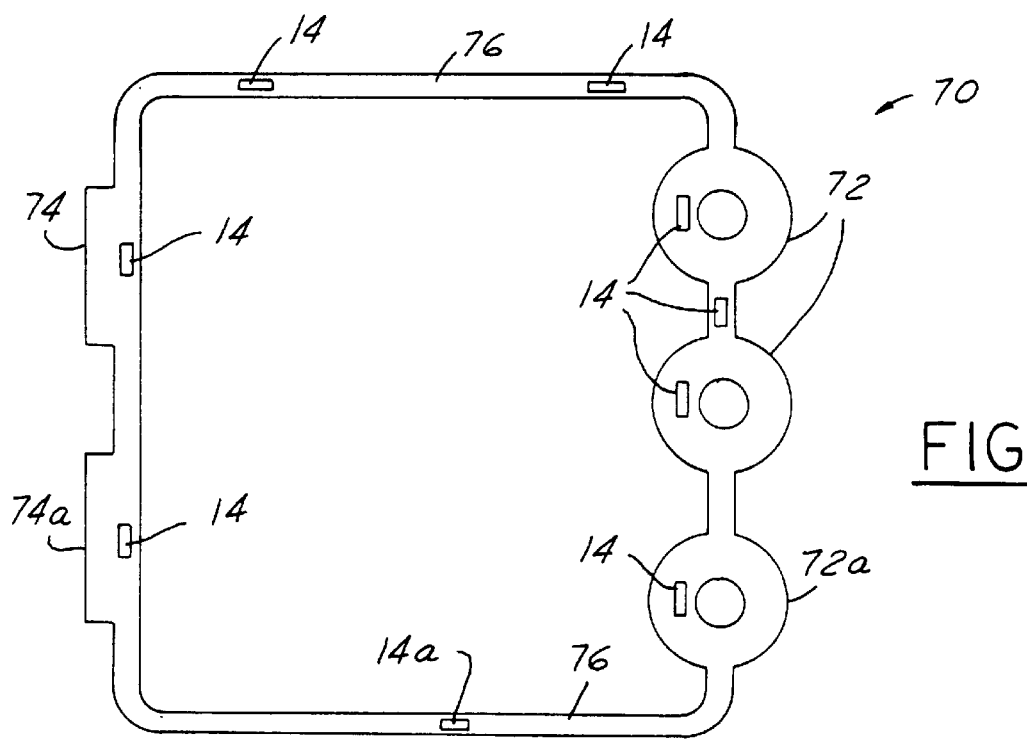
FIG. 4 illustrates another automated storage library system for use with the method and system of the present invention.

Referring now to FIG. 4, another automated storage library system 70 for use with the method and system of the present invention. Automated storage library system 70 includes cylindrical storage libraries 72 and rectangular storage libraries 74. Each of the robotic mechanism transfer ports in the enclosures of storage libraries 72 and 74 are connected by robotic mechanism guide structures 76. Robotic mechanisms 14 move along guide structures 76 to move from within the enclosure of one storage library to within the enclosure of another storage library for performing operations within the other storage library. For instance, robotic mechanism 14a shown in FIG. 4 moves along guide structure 76 from cylindrical storage library 72a to rectangular storage library 74a for performing operations at the rectangular storage library.

Thus it is apparent that there has been provided, in accordance with the present invention, a method and system for sharing robotic mechanisms between automated storage libraries that fully satisfy the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A storage library system comprising:
  a first storage library having an interior and an exterior, the first storage library having a robotic mechanism transfer port extending between the interior and the exterior of the first storage library, the interior of the first storage library having a plurality of interconnected guide tracks with one of the guide tracks of the first storage library being connected to the robotic mechanism transfer port of the first storage library;
  a robotic mechanism positioned on one of the guide tracks of the first storage library, wherein the robotic mechanism includes propulsion means operable for moving the robotic mechanism along the guide tracks of the first storage library;
  a second storage library having an interior and an exterior, the second storage library having a robotic mechanism transfer port extending between the interior and the exterior of the second storage library, the interior of the second storage library having a plurality of interconnected guide tracks with one of the guide tracks of the second storage library being connected to the robotic mechanism transfer port of the second storage library; and
  a guide structure routed between the exteriors of the first and second storage libraries from the robotic mechanism transfer port of the first storage library to the robotic mechanism transfer port of the second storage library, wherein the propulsion means of the robotic mechanism is operable for moving the robotic mechanism from the guide track of the first storage library connected to the robotic mechanism transfer port of the first storage library along the guide structure to the guide track of the second storage library connected to the robotic mechanism transfer port of the second storage library.

2. The storage library system of claim 1 wherein:
  the guide structure includes tracks.

3. The storage library system of claim 1 wherein:
  the guide structure includes rails.

4. The storage library system of claim 1 further comprising:
  a third storage library having an interior and an exterior, the third storage library having a robotic mechanism transfer port extending between the interior and the exterior of the third storage library, the interior of the third storage library having a plurality of interconnected guide tracks with one of the guide tracks of the third storage library being connected to the robotic mechanism transfer port of the third storage library; and a second guide structure routed between the exteriors of the first and second storage libraries from the robotic mechanism transfer port of the first storage library to the robotic mechanism transfer port of the third storage library, wherein the propulsion means of the robotic mechanism is operable for moving the robotic mechanism from the guide track of the first storage library connected to the robotic mechanism transfer port of the first storage library along the second guide structure to the guide track of the third storage library connected to the robotic mechanism transfer port of the third storage library.

5. The storage library system of claim 4 further comprising:

a third guide structure routed between the exteriors of the second and third storage libraries from the robotic mechanism transfer port of the second storage library to the robotic mechanism transfer port of the third storage library, wherein the propulsion means of the robotic mechanism is operable for moving the robotic mechanism from the guide track of the second storage library connected to the robotic mechanism transfer port of the second storage library along the third guide structure to the guide track of the third storage library connected to the robotic mechanism transfer port of the third storage library.

6. The storage library system of claim 1 further comprising:

a second robotic mechanism positioned on one of the guide tracks of the second storage library, wherein the second robotic mechanism includes propulsion means for moving the second robotic mechanism along the guide tracks of the second storage library, wherein the second robotic mechanism is movable along the guide structure from within the interior of the second storage library to within the interior of the first storage library.

7. The storage library of claim 1 wherein:

the robotic mechanism transfer ports of the first and second storage libraries limits human operator access into the interiors of the first and second storage libraries.

8. The storage library of claim 1 wherein:

the first storage library is a cylindrical storage library.

9. The storage library of claim 1 wherein:

the first storage library is a rectangular storage library.

10. A storage library system comprising:

a first storage library having an interior and an exterior, the first storage library having a robotic mechanism transfer port extending between the interior and the exterior of the first storage library, the interior of the first storage library housing a plurality of media object cells each housing a media object, the first storage library having a plurality of interconnected guide tracks which bound the media object cells of the first storage library with one of the guide tracks of the first storage library being connected to the robotic mechanism transfer port of the first storage library, the first storage library further having a first robotic mechanism movable along the guide tracks of the first storage library for accessing the media objects of the first storage library;

a second storage library having an interior and an exterior, the second storage library having a robotic mechanism transfer port extending between the interior and the exterior of the second storage library, the interior of the second storage library housing a plurality of media object cells each housing a media object, the second storage library having a plurality of interconnected guide tracks which bound the media object cells of the second storage library with one of the guide tracks of the second storage library being connected to the robotic mechanism transfer port of the second storage library; and a guide structure routed between the exteriors of the first and second storage libraries from the robotic mechanism transfer port of the first storage library to the robotic mechanism transfer port of the second storage library, wherein the first robotic mechanism is movable from the guide track of the first storage library connected to the robotic mechanism transfer port of the first storage library along the guide structure to the guide track of the second storage library connected to the robotic mechanism transfer port of the second storage library in order to move along the guide tracks of the second storage library for accessing the media objects or the second storage library.

11. The storage library system of claim 10 wherein:

the guide structure includes tracks.

12. The storage library system of claim 10 wherein:

the guide structure includes rails.

13. The storage library system of claim 10 further comprising:

a third storage library having an interior and an exterior, the third storage library having a robotic mechanism transfer port extending between the interior and the exterior of the third storage library, the interior of the third storage library housing a plurality of media object cells each housing a media object, the third storage library having a plurality of interconnected guide tracks which bound the media object cells of the third storage library with one of the guide tracks of the third storage library being connected to the robotic mechanism transfer port of the third storage library; and a second guide structure routed between the exteriors of the first and third storage libraries from the robotic mechanism transfer port of the first storage library to the robotic mechanism transfer port of the third storage library, wherein the first robotic mechanism is movable from the guide track of the of the first storage library connected to the robotic mechanism transfer port of the first storage library along the second guide structure to the guide track of the third storage library connected to the robotic mechanism transfer port of the third storage library in order to move along the guide tracks of the third storage library for accessing the media objects of the third storage library.

14. The storage library system of claim 13 further comprising:

a third guide structure routed between the exteriors of the second and third storage libraries from the robotic mechanism transfer port of the second storage library to robotic mechanism transfer port of the third storage library, wherein the first robotic mechanism is movable from the guide track of the second storage library connected to the robotic mechanism transfer port of the second storage library along the third guide structure along the guide tracks of the third storage library in order to move along the guide tracks of the third storage library for accessing the media objects of the third storage library.

* * * * *